March 6, 1928.

S. W. PHILLIPS

AUTOMOBILE JACK

Filed Sept. 20, 1926

1,661,575

Inventor
S. W. Phillips
By Bredoin Wight
Attorneys

Patented Mar. 6, 1928.

1,661,575

UNITED STATES PATENT OFFICE.

STEPHEN W. PHILLIPS, OF PROMPTON, PENNSYLVANIA.

AUTOMOBILE JACK.

Application filed September 20, 1926. Serial No. 136,530.

This invention relates to an automobile jack which is primarily intended to be attached to the axle housing of the machine and be retained there in position for use whenever desired. It can, however, be readily removed from the machine and used in another location when needed.

An object of the invention is to produce a simple and efficient device of this character which can be readily attached to the machine and will add no appreciable weight thereto.

A further object of the invention is to provide a construction which can be readily operated from various different points as may be found most convenient.

Further detail features of the invention will be apparent from the following description and will be set forth in the appended claims.

Figure 1:
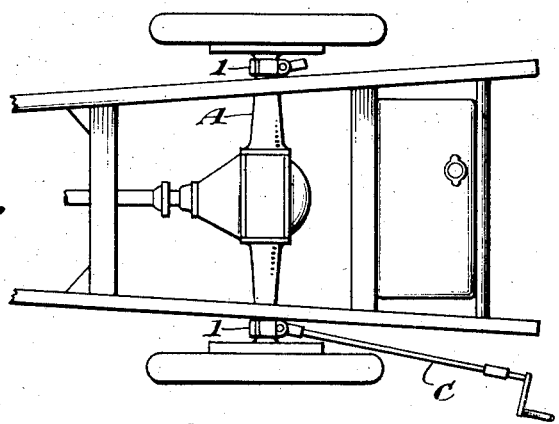
Figure 1 is a top plan view of a portion of the chassis of the automobile showing the device in operative position.
Figure 2:
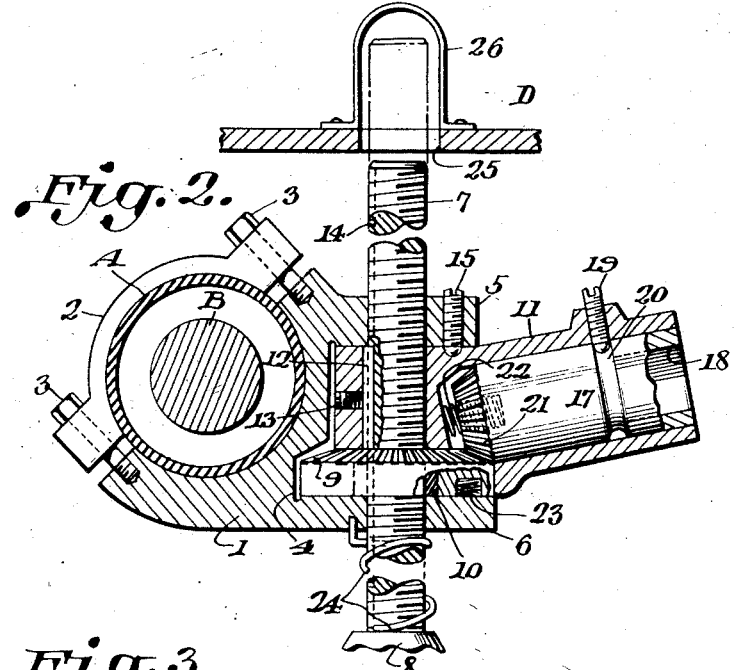
Figure 2 is a vertical section through the device.
Figure 3:
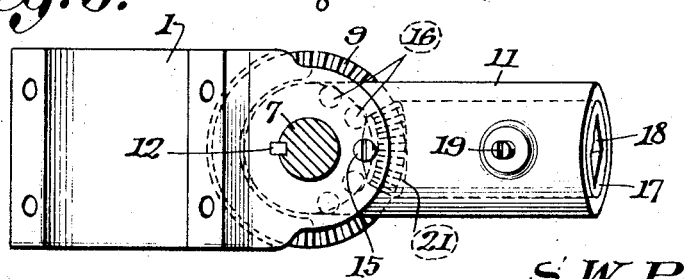
Figure 3 is a top plan view of the main member of the jack with parts in section.

The application of the invention is not limited to any particular type of automobile and there is accordingly illustrated in Figure 1 a conventional outline of a portion of an automobile, showing an axle housing A containing a rear axle B and illustrating the jack attached to the axle housing in position to be operated by the usual crank member C.

The device comprises a main casting 1 shaped to fit a portion of the axle housing and cooperating with a clamp member 2 also shaped to fit the opposite side of the axle housing. The two members are held together by means of bolts 3 which pass through the member 2 and are threaded into the main casting 1. It is obvious that the device may be attached to any desired portion of the axle housing and that it may be removed readily and used alone without the member 2.

One side of the casting 1 is hollowed out to form a chamber 4 having an upper wall 5 and a lower wall 6. A rod 7 of suitable size is screw threaded and passes through the walls 5 and 6, being positioned and guided by the same. This rod has a foot 8 at its lower end which is enlarged and has an uneven surface in order to engage more firmly the ground or other surface upon which it may rest.

In the chamber or cut-out 4 is located a bevel gear 9, the lower flat surface of which rests upon the upper surface of the wall or jaw 6. Fixed within this bevel gear is a bushing 10 made of suitable bearing metal and provided with an internal screw thread to engage the threads on the rod 7. This permits the gear itself to be made of cheaper metal and, therefore, lessens the cost of the device. A tubular member 11 is inserted in the cut-out or chamber 4 and has a body portion which surrounds the rod 7 and is provided with a spline 12 which is pressed by means of a spring 13 into a groove 14 extending longitudinally in the rod 7. This prevents relative rotary movement between the member 11 and the rod 7 at any time. A screw 15 passes through the upper wall or jaw 5 and engages at its lower end any one of a series of depressions 16 in the upper surface of the member 11. In this manner the member 11 may be adjusted about the axis of the rod 7 so that it will take up different angular portions and enable the jack to be operated from different points as may be most convenient.

A short shaft 17 fits within the tubular portion of the member 11 and has at its outer end a non-circular hole 18 adapted to receive the end of an operating crank of the usual type. A screw 19 is threaded through a boss on the tubular portion of the member 11 and the inner end of this fits in a circumferential groove 20 on the shaft 17, thus preventing any appreciable relative longitudinal movement between the shaft and the member 11.

The inner end of the shaft 17 is provided with a bevel gear 21 which meshes with the bevel gear 9 when the parts are assembled. A coil spring 22 fits within a cavity in the inner end of the shaft 17 and bears against the member 11, thus tending to force the shaft outwardly and preventing any rattling between these parts. The bevel gear 9 also has a cavity in its under face in which is positioned a coil spring 23 which bears against the jaw 6 and tends to force the bevel gear 9 into engagement with the gear 21. The purpose of this spring is also to prevent rattling of the parts. A coil spring 24 has one end fastened to the lower jaw 6 and is coiled about the rod 7. This lower end bears against the upper surface of the foot 8 and as the rod 7 is moved upwardly into its inoperative position, the spring 24 will be compressed and will prevent any rattling of the rod 7. It will be noted that the various springs act as anti-rattling devices and also tend to cushion operative movements of the parts.

The floor D of the car is provided with an opening 25 over which is placed a metal cover 26. This permits the shaft or rod 7 to be moved upwardly far enough to bring the lower end to a position where it cannot accidentally engage the surface over which the automobile is moving.

It will be noted that the invention provides a very simple, compact, and efficient structure which may be readily left affixed to the automobile and which can be operated from various different positions as may be found most convenient. It may, however, be readily removed and applied to an axle of an automobile in other positions or used for other purposes. It is obvious that various details of the construction may be varied without in any way departing from the spirit of the invention, which is to be regarded as limited only by the scope of the appended claims.

I claim as my invention:

1. An automobile jack comprising a body portion adapted to be secured to the axle of the automobile, a cut out in said body portion forming upper and lower arms, a bevel gear located in said cut out, an operating member having one end positioned in said cut out overlying the bevel gear, a screw threaded rod passing through said arms, the bevel gear and the operating member, and a screw passing through said upper jaw and adapted to engage the operating member at various points to hold it in different angular relations to the body portion.

2. An automobile jack comprising a body portion adapted to be secured to the axle of the automobile, a cut out in said body portion forming upper and lower arms, a bevel gear located in said cut out, an operating member having one end positioned in said cut out overlying the bevel gear, means rotatable in said operating member and having a gear engaging said bevel gear, a screw threaded rod passing through said arms, bevel gear, and operating member, and anti-rattling means associated with said bevel gear, said rotatable means, and said rod.

3. An automobile jack comprising a body portion adapted to be secured to the axle of the automobile, a cut out in said body portion forming upper and lower arms, a bevel gear located in said cut out, an operating member having one end positioned in said cut out overlying the bevel gear, a screw threaded rod passing through the arms, operating member, and bevel gear, and having a groove in one side thereof, a spline carried by said operating member and fitting in said groove, and resilient means for holding the spline in place.

In testimony whereof, I have hereunto subscribed my name.

STEPHEN W. PHILLIPS.